United States Patent [19]

Narumiya

[11] 4,302,502
[45] Nov. 24, 1981

[54] CERAMIC POROUS BODIES

[75] Inventor: Tsuneaki Narumiya, Yokohama, Japan

[73] Assignee: Bridgestone Tire Company Limited, Tokyo, Japan

[21] Appl. No.: 198,994

[22] Filed: Oct. 21, 1980

[30] Foreign Application Priority Data

Oct. 30, 1979 [JP] Japan .............................. 54-140100

[51] Int. Cl.³ .......................... B32B 3/26; B32B 9/00
[52] U.S. Cl. .................................. 428/311; 428/312; 428/697; 428/699; 428/701
[58] Field of Search ............... 428/310, 311, 312, 697, 428/699, 701

[56] References Cited
U.S. PATENT DOCUMENTS 3,451,841  6/1969  Kesten et al. ....................... 428/311
4,020,234  4/1977  Gardner ............................. 428/697

Primary Examiner—William J. Van Balen
Attorney, Agent, or Firm—Sughrue, Mion, Zinn, Macpeak & Seas

[57] ABSTRACT

A ceramic porous body useful as a filtering material for molten metal is disclosed. The ceramic porous body is formed by covering surfaces of cell strands of a ceramic porous body skeleton consisting essentially of silica, alumina and magnesia and having a bulk specific gravity of 0.3–0.6 with an activation layer consisting of 3–40% by weight per the weight of the skeleton of an activated alumina and 0.5–10% by weight of a flux for aluminum and has an average diameter of interconnected voids of 0.3–5.0 mm, a pressure loss of 0.3–30 mm as a water-gauge pressure when passing air through the body of 1 cm thick at a rate of 1 m/sec., a microsurface area of not less than 10 m²/g and a porosity of 75–95%.

2 Claims, 4 Drawing Figures

CERAMIC POROUS BODIES

The present invention relates to ceramic porous bodies useful as a filtering material for molten metal such as molten aluminum and the like. More particularly it relates to ceramic porous bodies having excellent properties as a filtering material for molten metal, which can simultaneously remove and reduce soluble impurities such as $H_2$, Na or the like and insoluble inclusions such as metal oxides or the like included, for example, in molten aluminum.

Aluminum or its alloy contains gases consisting mainly of hydrogen in both molten and solidified states. Such gases frequently gather around grain boundaries during the heat treatment, which causes cracking in the grain boundary or results in the formation of cavities during forging or the occurrence of blisters and pinholes during the rolling. Further, when a metal such as sodium or the like is fused in aluminum or its alloy, the solubility of hydrogen gas increases, which causes the occurrence of pinholes. Particularly, the presence of the above metal gives rise to considerable embrittlement in magnesium alloys. On the other hand, when solid impurities such as oxides and the like are existent in molten metal, they bring about drawbacks similar to the case of the gas impurities though both the impurities are different from each other in the action.

In order to remove the soluble impurities and solid inclusions from molten metal such as molten aluminum or the like, there has hitherto been adopted a two-step process for separately removing the soluble impurities and the solid inclusions. In this two-step process, the soluble impurities are usually removed by applying any one of (1) chlorine gas blowing, (2) addition of chloride, (3) nitrogen gas blowing, (4) redissolution and (5) vacuum degassing, while the solid inclusions are removed by passing molten metal through a filtering material made of alumina balls with a diameter of several millimeters or a sintered body of alumina particles.

However, such a two-step process is very troublesome in its operation and it is required to conduct sublimation of aluminum chloride because chlorine gas or flux is used in the removal of soluble impurities, so that the greatest care must be taken in performing this process in view of labor environments and public nuisance. Thus, the conventional methods for the removal of impurities have various problems to be solved.

The present invention improves the above mentioned drawbacks of the prior art and provides ceramic porous bodies usable as a filtering material for molten metal, which can continuously and efficiently remove the soluble impurities and solid impurities from molten metal.

According to the present invention, there is provided a ceramic porous body having a three-dimensional network cellular structure with a plurality of interconnected voids without clogging in any direction, characterized in that said ceramic porous body is formed by covering surfaces of cell strands of a ceramic porous body skeleton consisting essentially of silica, alumina and magnesia and having a bulk specific gravity of 0.3–0.6 with an activation layer consisting of 3–40% by weight per the weight of the skeleton of an activated alumina and 0.5–10% by weight of a flux for aluminum, and has an average diameter of the interconnected voids of 0.3–5.0 mm, a pressure loss of 0.3–30 mm as a water-gauge pressure when passing air through the body of 1 cm thick at a rate of 1 m/sec., a microsurface area of not less than 10 $m^2/g$, and a porosity of 75–95%. In the ceramic porous body according to the present invention, solid inclusions can efficiently be filtered off from molten metal by limiting the bulk specific gravity of the skeleton, amount of the activation layer consisting of activated alumina and flux for aluminum applied, average diameter of interconnected voids, pressure loss, microsurface area and porosity to the above defined ranges, respectively, while the molten impurities such as hydrogen, sodium and the like can surely be removed from molten metal by reacting and adsorbing them on the activation layer.

The present invention will now be described in greater detail with reference to the accompanying drawings, wherein.

Figure 1:
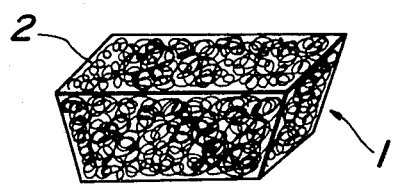
FIG. 1 is a perspective view of an embodiment of the ceramic porous body according to the present invention.
Figure 2:
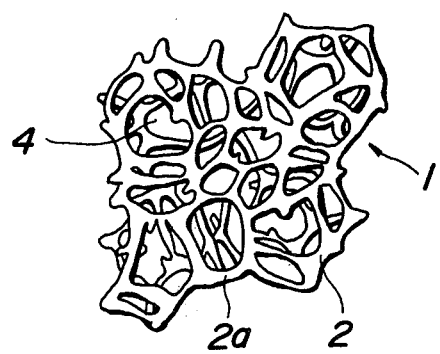
FIG. 2 is a partly enlarged side view of the embodiment shown in FIG. 1.
Figure 3:
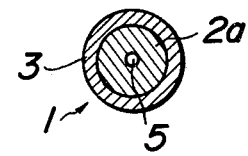
FIG. 3 is an enlarged sectional view of a cell strand in the ceramic porous body according to the present invention.

In FIG. 1 is shown a sketchy outline of a ceramic porous body 1 used as a filtering material for molten metal according to the present invention. The ceramic porous body 1 is obtained by adhering a ceramic slurry to an open-cell, flexible polyurethane foam as a substrate, firing it to carbonize and remove the foam to thereby form a ceramic porous body skeleton 2, and applying an activation layer consisting of an activated alumina and a flux for aluminum over whole surfaces of cell strands 2a of the skeleton 2. The thus obtained ceramic porous body 1 has substantially the same three-dimensional network cellular structure as that of the foam, wherein a plurality of interconnected voids 4 are existent therein without clogging in any direction (as shown in FIG. 2), and is shaped into a frustum of an inverted quadrangular pyramid as a whole. As shown in FIG. 3, a continuous cavity 5 corresponding to the shape of the foam is formed inside the cell strands 2a of the skeleton 2. Moreover, the interconnected voids 4 constitute flow paths for molten metal.

In the ceramic porous body 1 of the above mentioned structure according to the present invention, the skeleton 2 has a bulk specific gravity of 0.3–0.6, and the activation layer 3 consists of 3–40% by weight of the activated alumina and 0.5–10% by weight of the flux for aluminum based on the weight of the skeleton 2. By limiting the bulk specific gravity of the skeleton 2 to the above defined range and applying the activation layer consisting of the activated alumina and the flux for aluminum with the above defined amounts to the surfaces of the cell strands 2a, ceramic porous bodies can be obtained having higher mechanical and thermal strengths, which are sufficient in durability as the filtering material for high temperature molten metal and excellent in performance of favorably and efficiently removing the solid and molten impurities.

According to the present invention, the ceramic porous body after the formation of the activation layer has a three-dimensional network cellular structure with a plurality of interconnected voids without clogging substantially in any direction and is characterized by having an average diameter of the interconnected voids 4 of 0.3–5 mm, a pressure loss of 0.3–30 mm as a water-gauge pressure when passing air through the body of 1 cm thick at a rate of 1 m/sec. [measured according to a second test defined by Japanese Air Cleaning Associate (JACA No. 10)], a microsurface area of not less than 10 $m^2/g$, and a porosity of 75–95%. According to the ceramic porous body of the above construction, molten metal such as molten aluminum or the like containing impurities efficiently contacts with the activation layer 3 while being self-stirred, whereby the soluble impurities are separated from molten metal and at the same time the solid inclusions are effectively removed. Moreover, by increasing the microsurface area to not less than 10 $m^2/g$, the adsorption of impurities on the activation layer 3 is accelerated, while the function of the flux for aluminum contained in the activation layer 3 can be maintained over a long period of time. And also, by limiting the porosity to the above defined range, molten metal can be filtered at an appropriate filtering velocity and the mechanical strength of the filtering material can be maintained sufficiently.

According to the present invention, the material of the ceramic porous body skeleton 2 consists essentially of silica, alumina and magnesia, and is preferably a cordierite whiteware having a softening point of not less than 1,250° C. obtained by firing a ceramic slurry composed essentially of silica, alumina and magnesia at a temperature of not less than 1,300° C. When molten metal is filtered through the ceramic porous body 1 formed by using such ceramic materials, the body 1 can sufficiently withstand to thermal shock when it is preheated up to a temperature of molten metal to be filtered or during the filtration, and to corrosion of molten metal.

Next, the activation layer 3 consisting of activated alumina and flux for aluminum is formed on surfaces of cell strands 2a of the skeleton 2. In this case, β-, γ- or δ-activated alumina raw material is used for the formation of activated alumina, while $Na_3AlF_6$, NaCl, KCl, $CaF_2$, $AlCl_3$, LiF or a mixture thereof is used as a flux for aluminum. When using a substance stable at an activation temperature of alumina as a flux for aluminum, this substance is added to an alumina slurry, and the resulting mixture is applied to the surfaces of the cell strands 2a, dried and then fired to form an activation layer 3. On the other hand, when using a water-soluble flux, an activated alumina layer is first formed on the cell strands 2a, which is then impregnated with an aqueous solution of the flux and dried to form an activation layer 3. In any case, the flux is uniformly dispersed in the activation layer 3, so that the effect desired by the present invention can be achieved when limiting the amount of flux used to the above defined range.

Figure 4:
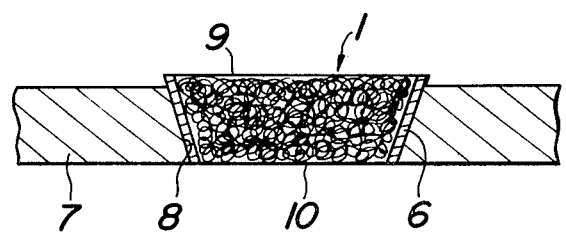
FIG. 4 is a longitudinal sectional view of an embodiment using the ceramic porous body according to the present invention as a filtering material for molten metal.

When the ceramic porous body 1 of the above mentioned structure is used as a filtering material for molten metal, as shown in FIG. 4, all of side surfaces of the body 1 are covered with a ceramic sheet 6, if necessary, and then the body 1 is fitted in a hole 8 having a frustum of an inverted quadrangular pyramid, which being formed in a support 7. In FIG. 4, molten metal is passed from an upper surface 9 of the body 1 into the interconnected voids 4 thereof, during which the soluble and solid impurities are filtered off from molten metal and then flows out from a bottom surface 10 of the body 1. Moreover, molten metal may flow from a small size surface of the body to a large size surface thereof by giving a head difference of molten metal, which is opposed to the case of FIG. 4.

As described above, the ceramic porous body 1 according to the present invention has a three-dimensional network cellular structure with a plurality of interconnected voids without clogging in any direction and is formed by covering surfaces of cell strands 2a of the skeleton 2 with an activation layer 3 consisting of 3–40% by weight of activated alumina and 0.5–10% by weight of flux for aluminum based on the weight of the skeleton, so that soluble impurities are adsorbed by the activation layer 3 when molten metal such as molten aluminum or the like contacts with the activation layer 3 and at the same time solid impurities are caught by the cell strands 2a. As a result the soluble and solid impurities can simultaneously be removed at one-step only by passing molten metal through the ceramic porous body 1 of the present invention.

In this case, the ceramic porous body 1 is characterized by having an average diameter of the interconnected voids of 0.3–5 mm and a pressure loss of 0.3–30 mm as a water-gauge pressure when passing air through the body of 1 cm thick at a rate of 1 m/sec., so that molten metal flows through the interconnected voids 4 with self-stirring to surely contact with the activation layer 3, during which the soluble impurities are efficiently removed and the solid impurities are well caught by the cell strands 2a.

As a substrate for the formation of the ceramic porous body skeleton 2, there is used a polyurethane foam having a skeletal reticulated structure wherein all of cell membranes are completely removed by heat, a chemical or the like, so that the good filtering performance is attained. That is, the skeletal structure after the removal of cell membranes forms a bucket of pentagonal dodecahedron, so that the porosity is large, the pressure loss is small, and the interconnected voids constituting a flow path for molten metal become complicated. Therefore, when molten metal flows through the ceramic porous body 1 made from the ceramic porous body skeleton by using the above mentioned structure as a substrate, not only the filtration can be performed at a small pressure loss state, but also the self-stirring of molten metal occurs during the passing through the body 1, so that molten metal is surely and evenly contacted with the cell strands 2a covered with the activation layer 3. As a result, the soluble impurities contained in molten metal are rapidly adsorbed by the activation layer 3 independently of the diffusion rate of each impurity molecule and at the same time, the solid impurities are caught by the cell strands 2a, and particularly the solid impurities having a size fairly smaller than the mesh size of the skeleton are removed from molten metal in large quantities. Hence, the ceramic porous body 1 sufficiently develops the inner filtering action and is very useful as a filtering material for molten metal.

Furthermore, the ceramic porous body 1 is characterized by having a microsurface area of not less than 10 $m^2/g$, so that the adsorption of impurities on the activation layer 3 is accelerated and the function of the flux contained in the activation layer 3 is held in a long time.

Moreover, the ceramic porous body 1 is very high in the mechanical and thermal strengths and sufficiently withstands thermal shock and the like produced in the filtration operation. It is very high in the practical use as a filtering material for molten metal.

The following examples are given in illustration of the invention and are not intended as limitations thereof.

EXAMPLE 1

As a substrate was provided a skeletal reticulated flexible polyurethane foam having a frustum of quadrangular pyramid wherein an upper surface is a square of 611×611 mm, a lower surface is a square of 577×577 mm and a height is 53 mm.

In an agitating tank was charged a powdery mixture of 50 parts by weight of cordierite made by Marusu Yuyaku Co., Ltd. as a trade name K-8 and 50 parts by weight of alumina made by Sumitomo Aluminum Co., Ltd. as a trade name AM-31 together with a liquid mixture of silica sol and water having a mixing ratio of 2:1 to prepare a ceramic slurry.

The flexible polyurethane foam was impregnated with the ceramic slurry. After the foam was taken out from the slurry, the excess amount of the slurry was removed without deforming the foam, and then the foam adhered with the slurry was dried at 70° C. for 24 hours. This procedure was repeated so as to obtain a given bulk specific density of a ceramic foam after fired. Then, the flexible polyurethane foam covered with the ceramic slurry was fired at about 1,350° C. to obtain a ceramic foam without clogging in any direction (Specimen No. 1 and No. 2).

An activated alumina made by Sumitomo Aluminum Co., Ltd. as a trade name A-11 was dispersed in water containing 15% of silica sol to form an alumina slurry. Then, the ceramic foam was thoroughly impregnated with the alumina slurry, dried at 70° C. for 12 hours after the removal of excess slurry and then fired at 600° C. for 1 hour to obtain a ceramic porous body covered with the activated alumina layer (Specimen No. 3 and No. 4).

Then, a flux for aluminum made by Tachikawa Chuzo Yozai Kogyosho as a trade name Tsubasa Flux AF No. 2Y was dissolved in water. Thereafter, the ceramic porous body covered with the activated alumina was impregnated with the resulting flux solution so that the amount of the flux applied is 5% by weight, and dried at 200° C. for 24 hours to obtain a ceramic porous body covered with an activation layer consisting of the activated alumina and the flux (Specimen No. 5 and No. 6).

The properties of these specimens are shown in the following Table 1.

TABLE 1

| Specimen No. | 1 | 2 | 3 | 4 | 5 | 6 |
|---|---|---|---|---|---|---|
| Average diameter of interconnected voids (mm) | 1 | 0.6 | 1 | 0.6 | 1 | 0.6 |
| Bulk specific gravity | 0.35 | 0.41 | 0.35 | 0.41 | 0.37 | 0.43 |
| Amount of activated alumina applied (%) | 0 | 0 | 17 | 20 | 17 | 20 |
| Amount of flux applied (%) | 0 | 0 | 0 | 0 | 5 | 5 |
| Pressure loss at 1 m/sec. (mm aq./cm) | 10 | 24 | 10 | 25 | 10 | 25 |
| Porosity (%) | 82 | 80 | 82 | 80 | 82 | 80 |
| Microsurface area (m$^2$/g) | 3.0 | 3.2 | 38 | 52 | 38 | 52 |

EXAMPLE 2

At first, a chamber with a depth of 500 mm was provided in a flow path for molten metal. In the chamber a flat partition plate having a thickness of 60 mm was arranged at a position of 350 mm downward from the upper end of the chamber. At the center of the partition plate was formed a tapered hole having a square of 593×593 mm at its upper surface and an inclination angle of 17.5° with respect to a direction perpendicular to the upper surface. In the hole was fitted each of the specimens through a packing composed of soft asbestos for preventing the floating of the ceramic foam during the filtration of molten metal. Further, the chamber was sufficiently preheated up to a given temperature near the filtering temperature prior to the passing of molten metal. Then, molten metal was supplied into the chamber so as not to directly fall onto the ceramic foam, whereby molten metal passed through the interconnected voids of the ceramic foam from the upside to the downside and flowed out over an output port.

A molten aluminum Alloy 5056 having a sodium content of 0.007% was passed through the chamber in the flow path at a rate of 400 kg/min. to prepare a slab or billets having a diameter of 152 mm. Then, the occurrence of surface cracks in the hot rolling and quantities of sodium and hydrogen were measured with respect to the slab, while the number of white spots according to the anodic oxidation process was measured with respect to the billet. The measured results are shown in the following Table 2.

TABLE 2

| | No filter | Specimen No. 1 | Specimen No. 2 | Specimen No. 3 | Specimen No. 4 | Specimen No. 5 | Specimen No. 6 |
|---|---|---|---|---|---|---|---|
| Surface cracks in the hot rolling | presence | presence | presence | none | none | none | none |
| Gloss of oxide coating | none | none | none | none | none | glossy | glossy |
| Sodium content (%) | 0.007 | 0.007 | 0.007 | <0.0005 | <0.0005 | <0.0005 | <0.0005 |
| Hydrogen content (Ncm$^3$/100 g) | 0.4 | 0.4 | 0.4 | <0.1 | <0.1 | <0.1 | <0.1 |
| Number of white spots | 53.3 | 20.1 | 7.7 | 19.6 | 7.1 | 15.7 | 6.1 |

It can be seen from Table 2 that the aluminum alloy after the filtration through the ceramic porous body according to the present invention has a good gloss at its surface after the anodic oxidation.

In the above embodiment, the ceramic porous body is shaped into the frustum of the inverted quadrangular pyramid as a whole, but the present invention may be embodied in other forms or carried out in other ways without departing from the scope thereof.

As explained above, when the ceramic porous body according to the present invention is used as a filtering material for molten metal such as molten aluminum or the like, the soluble and solid impurities can be continuously and efficiently removed from molten metal at one step, so that a very simple operation is achieved for the removal of impurities. Further, these impurities are completely removed only by passing molten metal through the ceramic porous body. That is, the ceramic porous body according to the present invention has very favorable properties as a filtering material for molten metal.

What is claimed is:

1. A ceramic porous body useful as a filtering material for molten metal and having a three-dimensional network cellular structure with a plurality of interconnected voids without clogging in any direction, characterized in that said ceramic porous body is formed by covering surfaces of cell strands of a ceramic porous body skeleton consisting essentially of silica, alumina and magnesia and having a bulk specific gravity of 0.3–0.6 with an activation layer consisting of 3–40% by weight per the weight of the skeleton of an activated alumina and 0.5–10% by weight of a flux for aluminum and has an average diameter of said interconnected voids of 0.3–5.0 mm, a pressure loss of 0.3–30 mm as a water-gauge pressure when passing air through the body of 1 cm thick at a rate of 1 m/sec., a microsurface area of not less than 10 $m^2/g$, and a porosity of 75–95%.

2. A ceramic porous body as claimed in claim 1, wherein said ceramic porous body skeleton is formed by adhering a ceramic slurry to an open-cell, flexible polyurethane foam as a substrate and firing it to remove the foam by carbonization and has substantially the same skeletal reticulated structure as that of the foam.

* * * * *